3,093,952
LAWN MOWER BLADE
Stanley W. Bonser, % Bonser Engineering, Gilbert, Pa.
Filed May 29, 1961, Ser. No. 113,218
4 Claims. (Cl. 56—295)

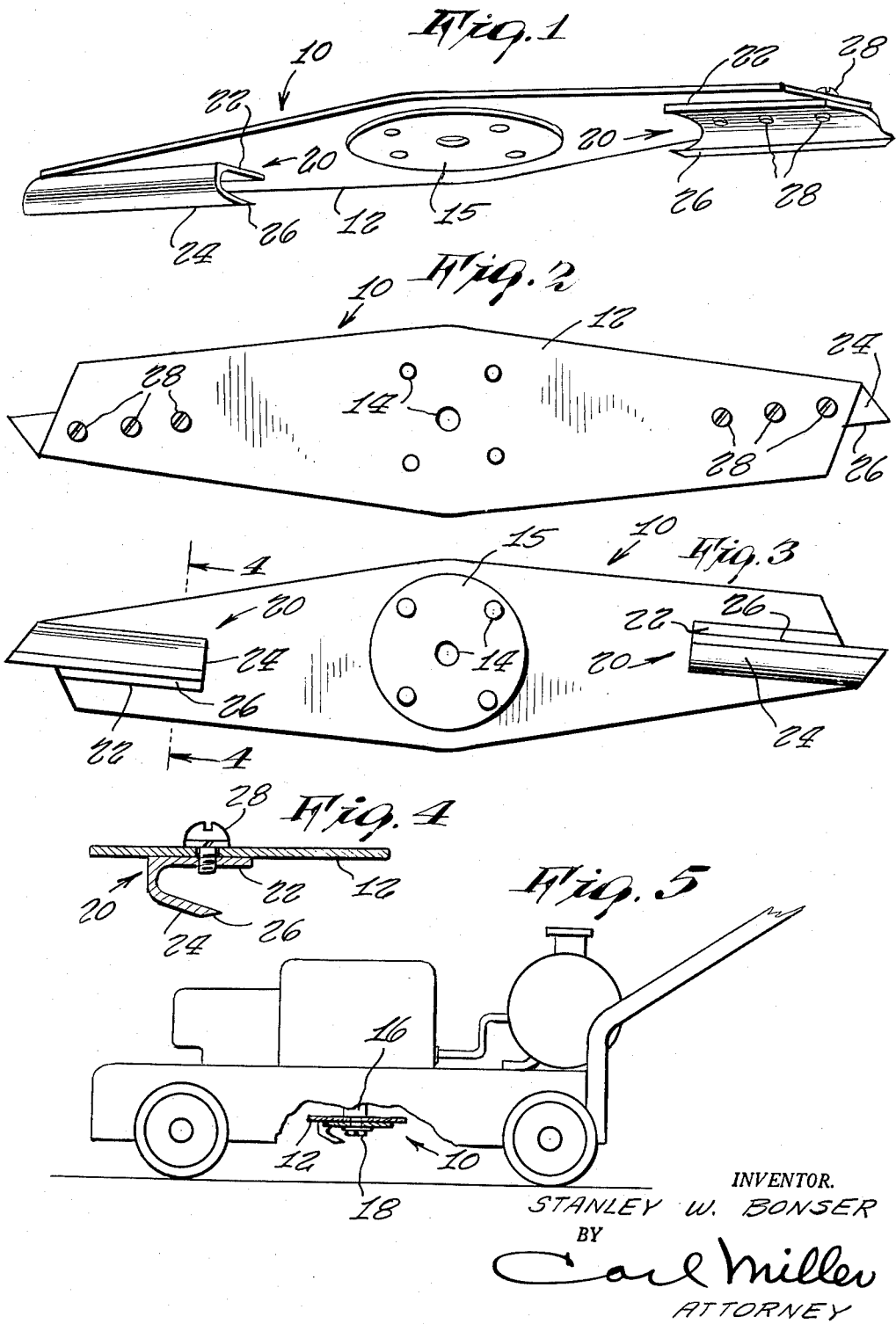

This invention relates to lawn mowers and more particularly to a blade therefor.

It is an object of the present invention to provide a lawn mower blade which can be readily serviced, and which is extremely effective in operation, in that it will create a vacuum to lift the blades of grass prior to cutting to provide a cleaner and more uniform cutting operation.

A further object of the present invention is to provide a lawn mower blade having replaceable elements which can be readily installed whenever required, and which will distribute a finely cut mulch over a wide area.

All of the foregoing and still further objects and advantages of this invention will become apparent from a study of the following specification, taken in connection with the accompanying drawing, wherein:

FIGURE 1 is a bottom perspective view of a lawn mower blade made in accordance with the present invention;

FIGURE 2 is a top plan view of the blade shown in FIGURE 1;

FIGURE 3 is a bottom plan view of the blade shown in FIGURE 1;

FIGURE 4 is an enlarged transverse cross sectional view taken along line 4—4 of FIGURE 3; and FIGURE 5 is a side elevational view, partly in section and having parts cut away, of a blade made in accordance with the present invention in actual use.

Referring now to the drawing, a lawn mower blade assembly 10 made in accordance with the present invention is shown to include a main blade support 12 having a reinforcing plate 15 secured to the lower central area thereof, and is provided with apertures 14 for facilitating the insertion and assembly of the mounting studs or bolts 18 of the lawn mower for securing the main blade 12 upon the drive shaft 16 of the mower motor.

Each end of the main blade support 12 is provided with a cutter element 20 which is of substantially C-shaped cross sectional configuration, as is shown in FIGURE 4, having a main mounting flange 22 and an annularly related depending flange 24 with a sharpened edge 26 for cutting grass with which it comes into contact. Consequently, the grass is cut and thereafter broken up into small pieces or finely divided mulch. As the blade support rotates, the finely cut mulch will be distributed over a wide area. These elements 22 are secured to the lower surface of the main blade 12, such as by mounting screws 28 which are easily disengaged for replacing the cutter elements 20 whenever required.

The particular shape of the cutter elements, as these elements depend downward from support 12, is such that during rotation a partial vacuum or suction is developed, thus creating an air turbulence and assuring proper positioning of the blades of grass as the cutting edges 26 come into contact therewith. Thus, an extremely efficient mower blade assembly has been provided which will facilitate the cutting of grass in a uniform and neat manner.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. A lawn mower blade assembly comprising a power mower drive shaft, a flat main blade support in the form of a horizontal plate tapered outwardly in oppositely longitudinal directions from the center thereof, the width of said support having a maximum value at the center and having equal minimum values at the extreme ends thereof, mounting means integral with said support for symmetrical secured engagement upon said shaft, and a plurality of cutter elements secured in spaced apart relationship upon the lower surface of said plate, and projecting downwardly therefrom, said elements having cutting edges displaced downward from said plate.

2. The combination according to claim 1, wherein said mounting means comprises a reinforcement plate secured to the upper surface of said main blade, and a plurality of perforations extending through said main blade and said reinforcement plate receiving the drive end of the power mower drive shaft.

3. The combination according to claim 2, wherein each one of said cutter elements comprise a substantially channel shaped element of generally C-shaped cross sectional configuration.

4. The combination according to claim 3, wherein each one of said cutter elements includes releasable mounting means for securing said cutter element upon the under surface of said main blade.

References Cited in the file of this patent
UNITED STATES PATENTS

| | | |
|---|---|---|
| 2,669,084 | Warren | Feb. 16, 1954 |
| 2,859,582 | Babcock | Nov. 11, 1958 |
| 2,924,059 | Beeston | Feb. 9, 1960 |
| 2,932,147 | Beeston | Apr. 12, 1960 |
| 2,969,634 | Lannert | Jan. 31, 1961 |
| 3,032,957 | Boyer | May 8, 1962 |